Figure 1:
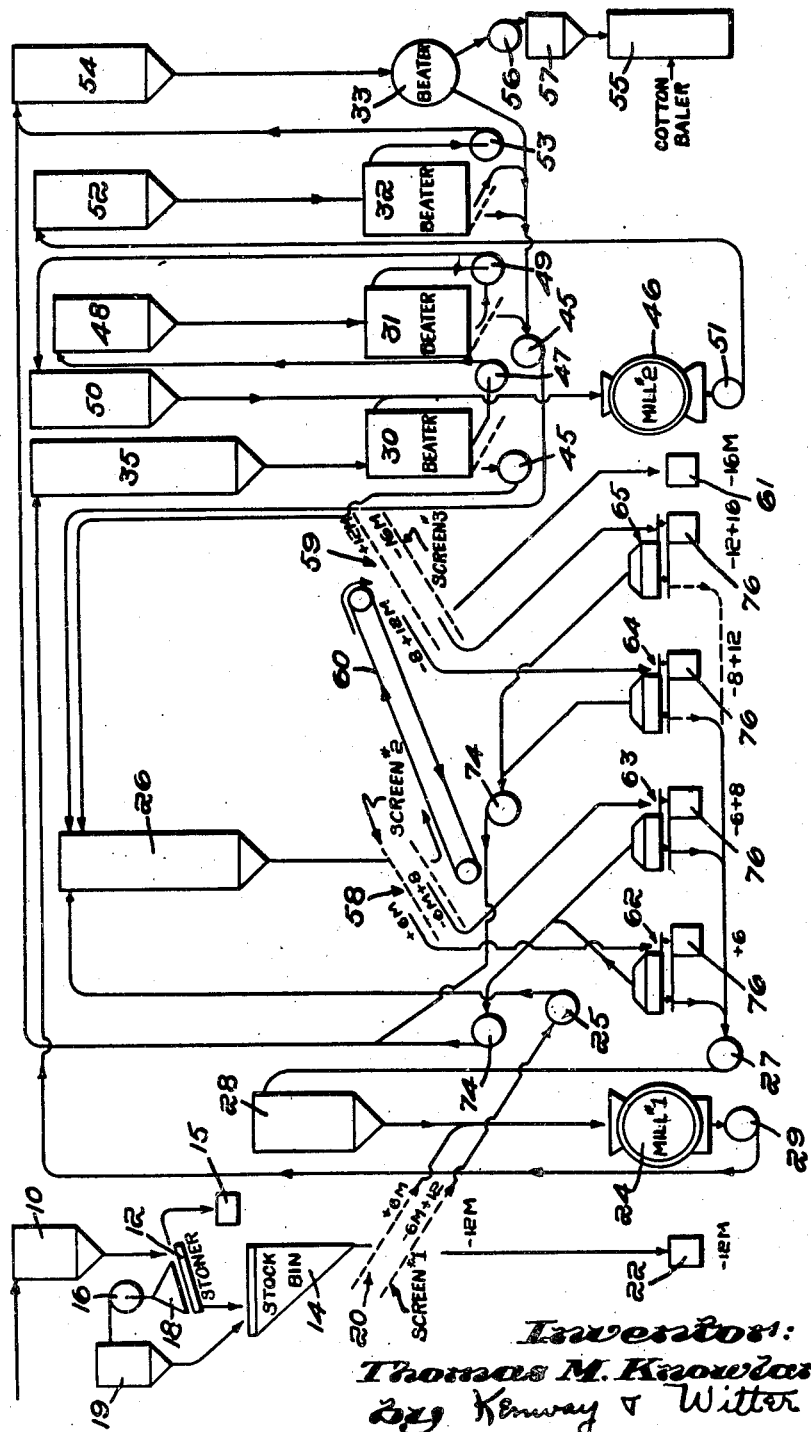

Feb. 22, 1949.   T. M. KNOWLAND   2,462,645
METHOD OF TREATING RUBBER SCRAPS
Filed July 10, 1945   4 Sheets-Sheet 2

Feb. 22, 1949. T. M. KNOWLAND 2,462,645
METHOD OF TREATING RUBBER SCRAPS
Filed July 10, 1945 4 Sheets-Sheet 3
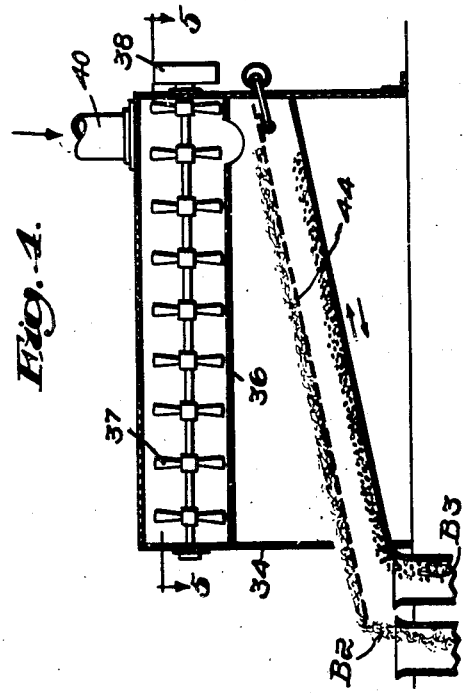
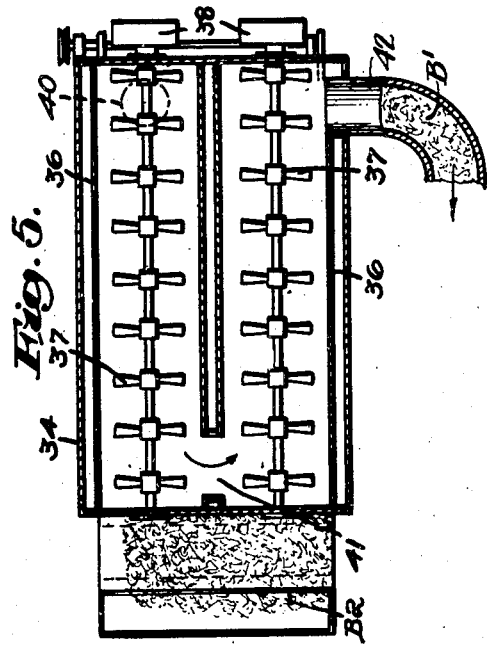
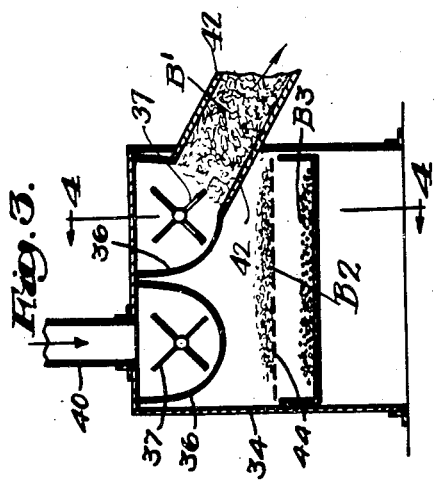
Inventor:
Thomas M. Knowland
by Kenway & Witter
Attorneys Feb. 22, 1949. T. M. KNOWLAND 2,462,645
METHOD OF TREATING RUBBER SCRAPS
Filed July 10, 1945 4 Sheets-Sheet 4
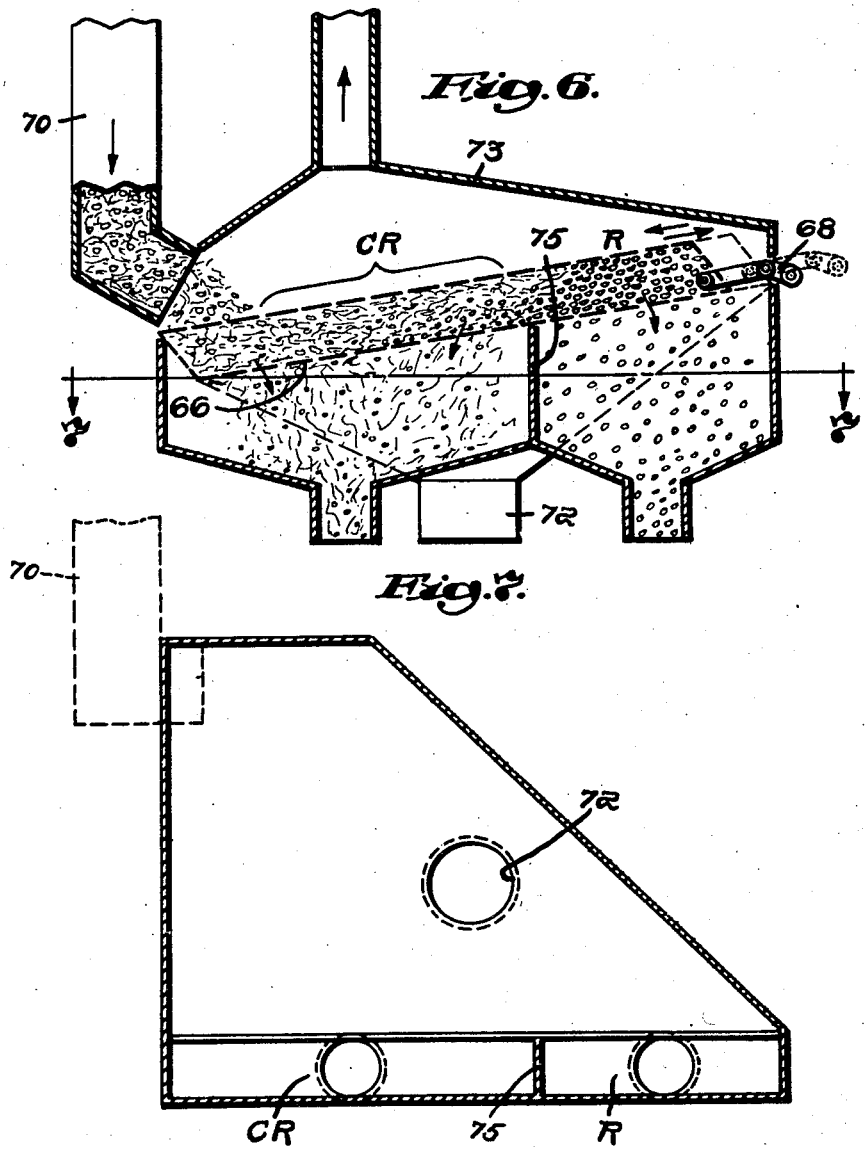

Patented Feb. 22, 1949

2,462,645

UNITED STATES PATENT OFFICE 2,462,645

METHOD OF TREATING RUBBER SCRAP

Thomas M. Knowland, Belmont, Mass., assignor to Boston Woven Hose and Rubber Company, Cambridge, Mass., a corporation of Massachusetts Application July 10, 1945, Serial No. 604,224

12 Claims. (Cl. 241—24)

This invention relates to the treatment of rubber tire scrap and the like to separate its rubber and fabric components. The value of these components for re-use depends to a very considerable extent upon the sharpness of the separation and the quality and character of the recovered components. Various processes have heretofore been employed for reclaiming this scrap, including chemical treatments, mechanical treatments, or a combination of these treatments, and various resulting products or reclaims have been produced. The combination reclaiming processes have many advantages from the standpoints of both economy and the value of the reclaimed products, but with such processes as are employed to date the preliminary separation of rubber from cotton has resulted in a rubber product containing such a relatively high percentage of fibre and a fibre product containing such a relatively high percentage of rubber that the subsequent value and use of both materials have been very substantially limited. Furthermore, the rubber recovered has been of a single grade of mixed composition whereas tire scrap contains two or more quite definite forms of rubber principally in the nature of hard and dense "tread" rubber and relatively soft "carcass" rubber each having characteristics differing from the other and each adapted in its reclaimed form to special uses for which the other is not adapted. The primary object of my invention resides in the production of a new, improved and more economical method of treating rubber scrap in a manner not only separating the rubber and fabric components with a sharpness heretofore impossible but furthermore in separating the rubber into its fractional components of tread rubber and carcass rubber.

It will be apparent that a sharper separation of the rubber and fabric components not only produces superior rubber products for further reclaiming and more valuable cotton products for re-use but furthermore results in increasing the quantities recovered to the extent that each has heretofore been lost in the other. The demand for and uses of cotton fibre containing a substantial amount of rubber are quite limited whereas the demand and uses for relatively clean fibre are of relatively wide scope. Also the value of "whole" tire rubber, including both tread and carcass rubber, containing considerable fibre is quite limited whereas relatively clean tread and carcass rubbers have considerable value as bases for finished reclaim.

The rubber products recovered from scrap are usually passed through a reclaiming process to condition them for use. This process cannot well be adapted to reclaiming both the tread fraction and the carcass fraction when the two fractions are mixed together as is the case in "whole" tire reclaim. Both the socalled "pan" and the "alkali" reclaiming processes when adjusted to properly reclaim the hard and dense tread fraction, will overprocess or result in too much softening or reclaiming action on the relatively soft carcass rubber. Similarly, a process adapted to reclaiming the soft carcass rubber will usually fail properly to soften up the hard tread portions of the reclaim, and will allow such hardened particles to float in the softer portions of the reclaim during the subsequent refining or grinding operations in which they appear as so-called "tailings." An important feature of my invention resides in the separating of the rubber component into its tread and carcass fractions which can thereafter be independently and efficiently processed as separate reclaims.

The process comprising my invention is wholly mechanical and contemplates first the reducing of the scrap to a suitable mixture of rubber-fabric particles and preferably includes a preliminary screening of this mixture to remove therefrom loose rubber particles smaller than a predetermined minimum mesh and comprising mainly carcass rubber. The coarser portions of the mixture are further mechanically reduced by grinding or shredding to separate the rubber from the fibre and the mixture is screened into groups of predetermined graded mesh sizes and subjected independently to an air flotation and gravity treatment particularly adapted to provide a sharp separation of the dense rubber particles from the relatively less dense fibre. Certain of these groups of predetermined and relatively larger mesh particles contain mainly tread rubber while the other groups of relatively smaller mesh contain mainly carcass rubber. By thus separating the mixture into fractions of predetermined mesh and treating these fractions independently by air flotation and gravity as hereinafter specifically described, I am able not only sharply to separate the rubber from the fibre but also to separate the rubber into its tread and carcass fractions.

My invention embodies a total and final treatment of the entire scrap to the end of producing not only a graded rubber product substantially free from fibre but also a fibre product relatively free from rubber, and contemplates further and repeated mechanical reduction of said coarser portions, beating the same to free the rubber from the fibre and further repeated screening, grading and treating of the resulting mixture until the rubber has been substantially removed and the remaining fibre is relatively clean. A further object of the invention resides in a novel and improved method embodying these functions as hereinafter more specifically described.

Figure 2:
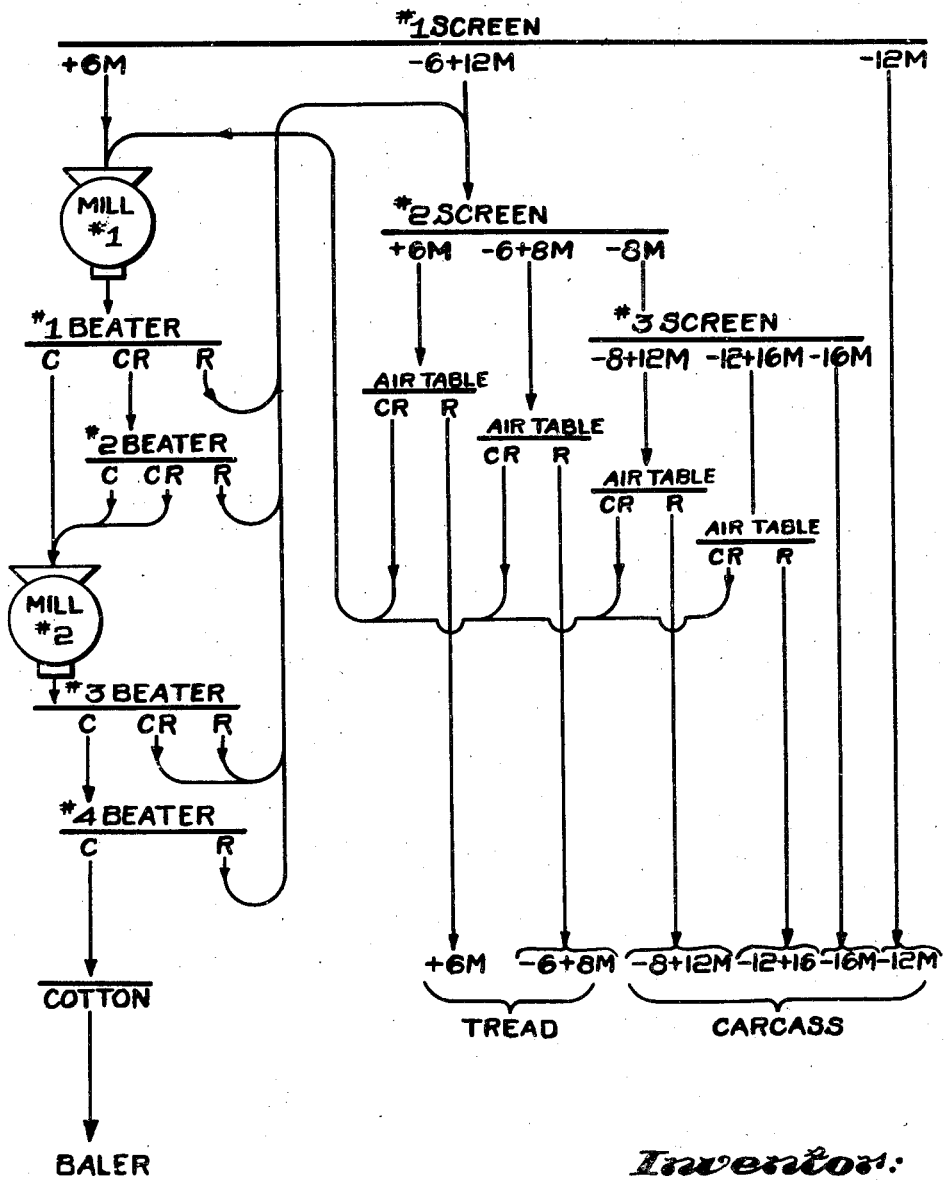

These and other features of the invention will be best understood and appreciated from the following description of a preferred embodiment thereof selected for purposes of illustration and shown in the accompanying drawings in which, Fig. 1 is a flow chart illustrating diagrammatically a preferred arrangement of mechanism for practicing my invention, Fig. 2 is a graph showing the steps of my process, Fig. 3 is a transverse sectional view through a beater employed, Fig. 4 is a longitudinal section taken on line 4—4 of Fig. 3, Fig. 5 is a plan section taken on line 5—5 of Fig. 4, Fig. 6 is a fragmentary diagrammatic view of an air separator table, Fig. 7 is a plan section taken on line 7—7 of Fig. 6.

The several steps and continuous process embodying my invention for the separation of rubber tire and like scrap into its rubber and fabric components are illustrated graphically in Figs. 1 and 2. Used rubber tires comprise the most available scrap for this purpose. The beads are first removed and the tires are then cracked into coarse pieces by running them through a chopper which cuts them into coarse pieces, then through grinder and screen system where the product is reduced to pieces approximating 1" x 1" in size. This product is delivered to a collector 10 (Fig. 1) from which the product is fed to a stoner 12 employed to remove any particles of metal, stones or other heavy foreign bodies which might become lodged in the reclaiming machinery or which might contaminate the reclaim.

The stoner 12 embodies an inclined foraminous table to the top portion of which the scrap material is fed from the collector 10. Air blown upwardly through the table tends to float the lighter particles while permitting the heavier particles to remain in contact with the table. The table is vibrated or reciprocated in the direction of its slope whereupon the lighter particles pass downwardly thereover and into a bin 14 while heavier particles, as stones and metals, remain in contact with the table and are carried upwardly over its top edge and into a bin 15. An exhaust fan 16 cooperating with a hood 18 takes up the air blown through the table and carries a small percentage of lighter fibre particles away from the table and delivers them to a collector 19 from which they are delivered to the storage bin 14. The material in the storage bin is ready for separation by my improved process which will now be described.

I employ a ribbon screw conveyor (not illustrated) at the bottom of the storage bin 14 for delivering the scrap material at a predetermined rate to a vibrating primary screening unit 20 (screen #1) comprising a top screen of 6 mesh and a bottom screen of 12 mesh.

The three scrap fractions resulting from this screening are as follows: The fraction smaller than 12 mesh (−12M) which passes through both screens is sufficiently cotton free so that it may be used at once in further mechanical or chemical reclaiming processes. This fine rubber fraction coming directly from the crackers has been subjected to a relatively small amount of attrition and after passing through the primary screen has been found to be almost entirely free of cotton. This rubber fraction which is mainly carcass rubber is deposited into a bin 22.

The fraction greater than 6 mesh (+6M) and comprising mainly particles of rubber and cotton firmly bonded to each other passes downwardly off the top screen and is delivered to an attrition mill 24 for further regrinding. The fraction smaller than 6 mesh and greater than 12 mesh (−6+12M) passes through the top screen and downwardly off the bottom screen and is delivered by a blower 25 to a collector 26. This fraction comprises rubber particles having almost no attached cotton fibres but mixed with cotton threads of such size that the mass cannot be screen separated into cotton and rubber but must be separated by the air flotation and gravity treatment hereinafter described.

As illustrated graphically in Fig. 2, the product of mill #1, which also includes a rubber-cotton (CR) mixture brought to the mill from the air separation tables by a blower 27 to and through a collector 28, is passed successively to and treated by a series of beaters 30, 31, 32 and 33. A blower 29 delivers this product to a collector 35 from which it is fed to the beater 30. The beaters 30, 31 and 32 are of the general construction illustrated in Figs. 3, 4 and 5 and the beater 33 is of a similar nature but of higher speed and employs a single cylinder for giving a final cleaning to the cotton before baling.

The beater illustrated in Figs. 3–5 comprises a housing 34 having two parallel foraminous troughs 36 therein with a rotary fan-like paddle assembly 37 in each trough and driven from pulleys 38. The arrangement is such that a cotton-rubber mixture which is fed into the housing through a duct 40 is progressively beaten against the perforated troughs so that the rubber particles are separated from the cotton and forced through the perforations. The cotton portion is progressively carried along the inlet trough and passes therefrom through an opening 41 into the second trough where it completes a return passage to the outlet 42. Rubber which passes through the trough openings in the beater falls upon a shaker screen 44 where it is split into two fractions, a $B^2$ fraction containing a relatively high percentage of cotton and a $B^3$ fraction consisting of rubber and a small amount of cotton. The fraction $B^3$ is sufficiently concentrated for screening and, as illustrated in Figs. 1 and 2, this fraction is passed by blowers 45 from all four beaters to the collector 26 for rescreening as hereinafter described.

The cotton portion $B^1$ is passed from the beater 30 to a second attrition mill 46 for regrinding and the fraction $B^2$ is passed by a blower 47 through a collector 48 to the beater 31. The $B^1$ and $B^2$ products from beater 31 are passed to the mill 46 by a blower 49 to and through a collector 50.

The product of mill 46 is passed by a blower 51 to the beater 32 through a collector 52 and the two products $B^2$ and $B^3$ of this beater are passed to the collector 26 for rescreening. The product $B^1$ which is a fairly clean cotton fraction is passed by a blower 53 through a collector 54 to the beater 33 which is of relatively higher speed and adapted to give the final cleaning treatment to the cotton before baling. The fraction $B^1$ from this beater is substantially clean cotton fibre ready for baling at 55 and the fraction B³ which contains some rubber is returned to the collector 26 for rescreening. A blower 56 delivers the B¹ fraction to a collector 57 for baling.

The collector 26, containing the −6+12M mixture from the screening unit 20 and the B³ and B² mixtures from the beaters, is associated with and delivers the mixture to a second screening unit 58 comprising a top screen of 6 mesh and a bottom screen of 8 mesh. Associated with the screening unit 58 is a third screening unit 59 comprising a top screen of 12 mesh and a bottom screen of 16 mesh. A belt conveyor 60 is provided for conducting the −8+12M fraction to the screening unit 59 and these two units are adapted to separate the mixtures into five fractions of +6M, −6+8M, −8+12M, −12+16M and −16M. The fraction −16M is a fine mixture of cotton fibre and rubber which cannot readily be further separated and which can be usefully employed in making reclaim for special articles where a certain percentage of textile fibre is permissible. This product is deposited into a bin 61.

Associated with the screening units 58 and 59 for the purpose of subjecting its first four graded fractions, above named, independently to the air flotation and gravity treatment of my process to separate their rubber and fabric components, are respectively four air flotation and gravity separating units 62, 63, 64 and 65. It is noted at this point that these two screening units together with the four air separator units comprise the final and most important portion of my novel process whereby I am able not only to separate the rubber and fabric components with a sharpness heretofore impossible but furthermore to separate the rubber into its fractional components of tread rubber and carcass rubber.

The units 62–65 are of substantially identical construction. As illustrated in Figs. 1 and 6, each unit embodies a foraminous deck 66 of very fine mesh permitting air to be forced upwardly therethrough. The deck is inclined upwardly to the rear and also to the right as shown in Fig. 6 and is reciprocated longitudinally by mechanism 68. The velocity of motion to the left is greater than to the right whereby causing the material in substantial gravity contact with the deck to work upwardly to the right. The forward slope of the deck also causes this material to work forwardly and fall off the forward edge of the deck.

The scrap material to be separated is fed onto the left rear end of the deck from a spout 70 from which it gradually works forwardly and separates into its rubber and cotton components as the deck is reciprocated. Air blown upwardly through the decks from conduits 72 is received and carried away by hoods 73 together with dust and lint that would otherwise escape to the atmosphere. This air and lint are delivered by blowers 74 to the collector 54 and beater 33. The air forced through the deck tends to lift the cotton containing portions clear of the deck and reduces their gravity contact therewith, thus diminishing the reciprocating effect of the deck on such portions and allowing them gradually to work their way off the forward and left hand edge of the deck. The rubber particles, being of greater specific gravity and consequently having greater response to the deck motion, are gradually carried upward therewith to the right and tend to work their way off the forward and right hand edge of the deck. In practice the separation is not clean cut and a baffle or separator bar 75 is so disposed that clean rubber R is taken from the deck to the right of the bar while a variable product CR consisting of almost clean cotton to almost clean rubber is taken from the left thereof. The rubber is deposited into suitable containers 76 and the variable product is delivered by the blower 27 to the collector 28 and from which it is again passed through the mill 24 for further and repeated processing and treatment.

As illustrated in the drawings, the +M6, −6+8M, −8+12M and −12+16M fractions from the screens 58 and 59 are delivered respectively to the separator units 62, 63, 64, 65 and each such unit is constructed to operate on its particular fraction and produce a corresponding rubber product. The rubber products produced by these four units and deposited into the containers 76 are of the grades +6M, −6+8M, −8+12M and −12+16M. These units together with the beater 33 represent a final disposition and separating of the mixture into its component products, the final fibre product which is baled at 55 being a superior, cleaner and more salable cotton produced at much lower power cost than by any process heretofore known.

The final rubber products produced by my process are as follows:

| Item No. | Particle Size | Kind of Product | Source |
|---|---|---|---|
| 1 | −12 Mesh | Mainly carcass rubber. | From screening unit 20. |
| 2 | +6 Mesh | Mainly tread rubber. | From separator unit 62. |
| 3 | −6+8 Mesh | do | From separator unit 63. |
| 4 | −8+12 Mesh | Mainly carcass rubber. | From separator unit 64. |
| 5 | −12+16 Mesh | do | From separator unit 65. |
| 6 | −16 Mesh | Mixture cotton and rubber. | From screening unit 59. |

Items 1, 4 and 5 are mainly carcass rubber, or that portion of the tire rubber which is in intimate contact with the tire fabric. It is a softer more elastic rubber than that from the tread portions of the tire and contains a higher percentage of rubber hydrocarbon. Items 2 and 3 consist mainly of tread rubber which is tougher and more highly compounded than the carcass rubber. Item 6 is a fine mixture of cotton fibre and rubber which cannot readily be further separated and which can be usefully employed in making reclaim for special articles where a certain percentage of textile fibre is permissible. For reasons heretofore defined, this separating of the rubber portion into its component units has very definite advantages in the further reclaiming processes employed.

It is furthermore pointed out that my novel process not only produces cleaner, superior and more valuable rubber and fibre products but also produces more of each by the greater and sharper degree of separation attained, the main objects of the invention being greater quantity and uniformity of product and lower power cost per ton of material handled. The routing of the mixture and the feeding back for further treatment of certain portions, as herein described and illustrated, comprise important features of the invention.

It will now be apparent that the tread rubber embodies relatively coarse particles and the carcass rubber embodies relatively fine particles and this relationship is employed in my novel process to separate these two components. This relationship results from the relatively thick tire scrap tread which breaks up into relatively coarse particles and the softer character of the carcass rubber and its intimate combination with the fabric. The tread rubber, being relatively harder and thicker, more readily breaks up into larger pieces whereas the carcass rubber requires more milling and beating to separate it from the fabric. This relationship together with the screening, milling, beating, air flotation and gravity treatment and the feed-back of the incompletely separated product for further treatment combines to effect the 100% total separation of the scrap into the rubber and fabric items herein described.

Considering by weight the total mixture treated by the process from the storage bin 14 as 100%, following are the results I have produced in the employment of my process in the treatment of tire scrap.

|  | Percent |
|---|---|
| Rubber item #1 | 9.3 |
| Rubber item #2 | 19.7 |
| Rubber item #3 | 13.7 |
| Rubber item #4 | 17.4 |
| Rubber item #5 | 6.8 |
| Rubber item #6 | 7.4 |
|  | 74.3 |
| Cotton | 25.7 |
|  | 100 |

Having thus disclosed my invention what I claim as new and desire to secure by Letters Patent of the United States is:

1. A method of treating rubber tire scrap and the like to separate the rubber and fabric components and further separate the rubber components into tread and carcass rubber fractions, which consists in mechanically reducing the scrap to a mixture of rubber-fabric particles including relatively coarse tread rubber particles, relatively fine carcass rubber particles and cotton fibres intermingled with the rubber particles, screening the mixture to separate therefrom a plurality of portions of predetermined graded mesh sizes including said relatively coarse tread rubber particles of predetermined mesh intermingled with said fibres and said relatively fine carcass rubber particles of predetermined mesh intermingled with said fibres, conducting said relatively coarse and relatively fine screened portions respectively to independent treating stations and subjecting them independently to air flotation and gravity treatment at said treating stations to separate their rubber and fabric components, said treatment being characterized by the supporting of the mixture on an inclined foraminous deck at each station while simultaneously directing air upwardly therethrough against the mixture and reciprocating the deck in a manner causing the heavier particles to travel upwardly thereon relative to the lighter particles, thereby separating the relatively free rubber from the mixture.

2. The method defined in claim 1 plus the step of returning the fabric-containing components of said graded portions to a reducing station, further mechanically reducing the same at said station and again screening the resulting mixture into portions of graded mesh sizes and treating said portions independently by said air flotation and gravity to separate their rubber and fabric-containing components as defined in claim 1.

3. The method defined in claim 1 plus the step of further mechanically reducing at a second reducing station, independently of the first named reducing, that portion of the screened mixture larger than a predetermined mesh, the step of returning the fabric-containing components of said graded portions to said second reducing station, further mechanically reducing the same at said station, and again screening the product of the second reducing station into portions of graded mesh sizes and treating said portions independently by said air flotation and gravity to separate their rubber and fabric-containing components as defined in claim 1.

4. The method defined in claim 1 in which the mechanically reduced scrap mixture is first screened to separate therefrom a portion smaller than a predetermined mesh size, and thereafter screening and treating said portion as defined in claim 1 to separate its tread rubber, carcass rubber and fibre components.

5. The method defined in claim 1 in which the mechanically reduced scrap mixture is first screened to separate therefrom a minimum size portion comprising mainly carcass rubber particles smaller than a predetermined mesh and an intermediate size portion larger than said predetermined mesh but smaller than a larger predetermined mesh, and further screening and treating said intermediate size portion as defined in claim 1 to separate its tread rubber, carcass rubber and cotton fibre components.

6. The method defined in claim 5 plus the steps of further mechanically reducing, independently of the first named reducing, the portion of the screened mixture larger than the said larger mesh, and screening and treating the resulting product as defined in claim 1 to separate its tread rubber, carcass rubber and fibre components.

7. The method defined in claim 1 plus the step of further screening one of said portions into a further plurality of portions of predetermined mesh sizes, thereafter again screening one of said further portions to separate therefrom a plurality of portions of predetermined mesh sizes, and treating the last named portions independently as defined in claim 1 to separate their rubber and fabric components.

8. The method defined in claim 7 in which the said screening of one of said further portions includes the separating therefrom of particles smaller than a predetermined mesh and comprising mainly carcass rubber and the separating of the remaining portion larger than said mesh into said plurality of portions of predetermined mesh sizes.

9. The method defined in claim 1 plus the step of further mechanically reducing, independently of the first named reducing, that portion of the screened mixture larger than a predetermined mesh size, beating the further reduced portion further to free the rubber from the fabric, screening the beaten mixture to separate therefrom portions of predetermined graded mesh sizes, and subjecting said portions independently to said air flotation and gravity treatment.

10. The method defined in claim 9 plus the step of further mechanically reducing, independently of the first named reducings, that portion of the beaten and screened mixture larger than a predetermined mesh size, beating the resulting mixture further to free the rubber from the fabric, screening and grading therefrom into predetermined mesh sizes the particles smaller than a predetermined mesh, and subjecting such screened and graded particles to said air flotation and gravity treatment to separate the cotton from the rubber particles and separate the rubber particles into said relatively coarse tread rubber and said realtively fine carcass rubber.

11. The method defined in claim 1 in which said screening of the mixture separates therefrom a maximum size fibre-containing portion larger than a predetermined mesh, conducting said portion and said fibre-containing component to a common station, further mechanically reducing said portion and component at said station, and thereafter beating, screening and treating the resulting product by said air flotation and gravity to separate the rubber and fabric components as defined in claim 1.

12. A method of treating rubber tire scrap and the like to separate the rubber and fabric components and further separate the rubber components into tread and carcass rubber fractions, which consists in mechanically reducing a coarse portion of the scrap to a finer mixture of rubber-fabric particles, beating the resulting product further to free the rubber and fabric components, screening the beaten product to separate therefrom two fractions consisting respectively of (1) rubber and a high percentage of fabric and (2) rubber and a small percentage of fabric, screening the (2) fraction to separate therefrom a plurality of portions of predetermined graded mesh sizes including a relatively coarse tread rubber portion intermingled with fibres and a finer carcass rubber portion intermingled with fibres, treating said tread and carcass rubber portions independently by air flotation and gravity to separate rubber therefrom, further beating and screening the (1) fraction to free and separate rubber therefrom, further reducing, beating and screening the remainder left of the first and second named beaten products, after said separation of rubber therefrom, further to separate the rubber from the fabric, and finally treating including screening the rubber-containing portion of all the resulting products from the last named beating and screening to air flotation and gravity to separate the rubber and fabric-containing components, said air flotation and gravity treatment being characterized by the supporting of said portion of the products on an inclined foraminous deck while simultaneously directing air upwardly therethrough against the product and reciprocating the deck in a manner causing the heavier particles to travel upwardly thereon relative to the lighter particles, thereby separating therefrom the relatively free rubber.

THOMAS M. KNOWLAND.

REFERENCES CITED

The following references are of record in the file of this patent:

UNITED STATES PATENTS

| Number | Name | Date |
|---|---|---|
| 281,769 | Kent | July 24, 1883 |
| 898,020 | Sutton et al. | Sept. 8, 1908 |
| 1,401,795 | Kohler et al. | Dec. 27, 1921 |
| 1,607,291 | Marie | Nov. 16, 1926 |
| 1,632,520 | Sutton et al. | June 14, 1927 |
| 1,695,569 | Arms | Dec. 18, 1928 |
| 2,126,672 | Smith | Aug. 9, 1938 |

OTHER REFERENCES

"Separating Dry Commodities by Specific Gravity," published by Sutton, Steele & Steele, Inc., Dallas, Texas. Received November 7, 1938, copy in Division 25, 209/467. Page 3.